(12) United States Patent
Perez et al.

(10) Patent No.: US 10,379,670 B1
(45) Date of Patent: Aug. 13, 2019

(54) INCREASING LOW-FORCE ACCURACY AT A DEVICE

(71) Applicant: MICROSOFT TECHNOLOGY LICENSING, LLC, Redmond, WA (US)

(72) Inventors: Ahia Perez, Ramat Gam (IL); Vadim Mishalov, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 15/499,630

(22) Filed: Apr. 27, 2017

(51) Int. Cl.
| | |
|---|---|
| *G06F 3/041* | (2006.01) |
| *G09G 3/36* | (2006.01) |
| *G06F 3/044* | (2006.01) |
| *G06F 3/0354* | (2013.01) |
| *G06F 3/038* | (2013.01) |

(52) U.S. Cl.
CPC .......... *G06F 3/0418* (2013.01); *G06F 3/0383* (2013.01); *G06F 3/03545* (2013.01); *G06F 3/044* (2013.01); *G06F 2203/04105* (2013.01)

(58) Field of Classification Search
CPC .............................. G06F 3/03545; G06F 3/038
See application file for complete search history.

(56) References Cited

U.S. PATENT DOCUMENTS

| | | |
|---|---|---|
| 3,856,536 A | 12/1974 | Siegelman et al. |
| 4,111,052 A | 9/1978 | Sniderman |
| 4,142,175 A | 2/1979 | Herbst et al. |
| 5,004,872 A | 4/1991 | Lasley |
| 5,040,306 A | 8/1991 | McMurtry et al. |
| 5,488,204 A | 1/1996 | Mead et al. |
| 5,548,092 A | 8/1996 | Shriver |

(Continued)

FOREIGN PATENT DOCUMENTS

| | | |
|---|---|---|
| EP | 2365424 A2 | 9/2011 |
| EP | 3101513 A1 | 12/2016 |

OTHER PUBLICATIONS

Kim, et al., "Does Human Finger's Pressure Sensing Improve User Text Input on Mobile Device? A Study on Input Performance Improvement Based on Human Finger's Pressure on Mobile Device", In International Journal of Distributed Sensor Networks, vol. 2014, Jul. 21, 2014, pp. 1-9.

(Continued)

*Primary Examiner* — Nelson M Rosario
(74) *Attorney, Agent, or Firm* — Arent Fox LLP

(57) ABSTRACT

Methods and devices are disclosed for increasing low-force accuracy at a device, such as a pen or a stylus which are used for communicating with a digitizer. An example method describes detecting an amount of force at the tip of the device and generating a voltage associated with the amount of force. The example method further includes logarithmically sampling the voltage to produce a digital value associated with the amount of force and determining whether the device is operating in an inking state based on the digital value. An example device may include a pressure sensor to detect an amount of force and generate a voltage associated with the amount of force, a sampling circuit to sample the voltage to produce a digital value, a memory and a processor in communication with the memory to determine whether the device is operating in an inking state based on the digital value.

18 Claims, 10 Drawing Sheets

(56) References Cited

U.S. PATENT DOCUMENTS

| | | |
|---|---|---|
| 5,635,683 A | 6/1997 | McDermott et al. |
| 5,959,613 A | 9/1999 | Rosenberg et al. |
| 7,202,862 B1 | 4/2007 | Palay et al. |
| 7,436,397 B2 | 10/2008 | Zank |
| 8,536,471 B2 | 9/2013 | Stern et al. |
| 9,176,604 B2 | 11/2015 | Krah et al. |
| 9,218,073 B1 | 12/2015 | Kremin et al. |
| 9,500,552 B2 | 11/2016 | Williams |
| 9,542,014 B1 | 1/2017 | Sundara-Rajan |
| 9,841,828 B2 * | 12/2017 | Peretz .................. G06F 3/03545 |
| 2008/0106520 A1 | 5/2008 | Free et al. |
| 2010/0051356 A1 | 3/2010 | Stern et al. |
| 2015/0116289 A1 | 4/2015 | Stern et al. |
| 2015/0138128 A1 | 5/2015 | Herrick et al. |
| 2015/0277596 A1 | 10/2015 | Hoffman et al. |
| 2015/0324018 A1 * | 11/2015 | Hinson ............... G06F 3/03545 345/179 |
| 2016/0109965 A1 | 4/2016 | Chan et al. |
| 2016/0239106 A1 | 8/2016 | Ballan et al. |
| 2016/0306444 A1 | 10/2016 | Fleck |
| 2018/0232068 A1 | 8/2018 | Gordon et al. |

OTHER PUBLICATIONS

Annett, et al., "Hands, Hover, and Nibs: Understanding Stylus Accuracy on Tablets", In Proceedings of the 41st Graphics Interface Conference, Jun. 3, 2015, pp. 203-210.

"International Search Report and Written Opinion Issued in PCT Application No. PCT/US18/026625", dated Jul. 11, 2018, 12 Pages.

"International Search Report and Written Opinion Issued in PCT Application No. PCT/US18/028728", dated Jul. 24, 2018, 14 Pages.

Shams, et al., "A Monolithic Opto-Coupler Based Sensor for Contact Force Detection in Artificial Hand", In Proceedings of 2nd International Conference on Robotics and Artificial Intelligence (ICRAI), Nov. 1, 2016, pp. 186-189.

"Non Final Office Action Issued in U.S. Appl. No. 15/595,598", dated Oct. 18, 2018, 18 Pages.

"Final Office Action Issued in U.S. Appl. No. 15/595,598", dated Apr. 5, 2019, 20 Pages.

* cited by examiner

INCREASING LOW-FORCE ACCURACY AT A DEVICE

BACKGROUND

The present implementations relate to detecting a force applied at a tip of a pen or a stylus during communications or interactions with a digitizer, and more particularly, to improving accuracy of detecting the force at the pen.

Electromagnetic pens are known in the art for use and control of the digitizer. Position detection of the pen provides input to a computing device associated with the digitizer and is interpreted as a user command. Position detection is performed while the tip of the pen is either touching and/or hovering over a detection surface of the digitizer. Often, the digitizer is integrated with a display screen and a position of the pen over the screen is correlated with information portrayed on the screen.

Some pens are pressure sensitive and may sense and report a level of pressure or force applied at/on the tip of the pen while a user is using the pen. However, the current pens have same or similar sensitivity regardless of the amount of force at the tip of pen, which may lead to errors when determining whether the pen is an inking state as the amount of force (e.g., activation force) that is needed to activate the pen or transition the pen to an inking state is in the low-force or low-forces range.

Therefore, there is a need for a mechanism to improve accuracy at low forces (e.g., low-force accuracy) at a pen.

SUMMARY

The following presents a simplified summary of one or more disclosed features in order to provide a basic understanding of the disclosure. This summary is not an extensive overview of all contemplated implementations, and is intended to neither identify key or critical elements of all implementations nor delineate the scope of any or all implementations of the present disclosure. Its sole purpose is to present some concepts of one or more features of the present disclosure in a simplified form as a prelude to the more detailed description that is presented later.

A digitizer may operate in a search mode or a tracking mode. The digitizer operates in a search mode when there is no communication or contact with the pen, or the communication or contact with the pen is lost and the digitizer is searching for a transmission signal, such as a beacon, from the pen. Once the digitizer finds the transmission signal from the pen, the digitizer performs a synchronization with the pen and the digitizer transitions to a tracking mode. In the tracking mode, the digitizer is in synchronization with the transmission signal from the pen and can receive information from the pen.

A pen may distinguish between when a user is pressing on the pen (e.g., pressing on the tip of the pen) in contrast to the pen hovering over the digitizer (e.g., hovering over the screen of the digitizer). The ability to distinguish between the user pressing on the tip of the pen and the pen hovering over the screen of the digitizer allows the pen to determine whether the pen is an inking state (e.g., the user pressing on the pen, the pen communicating with the digitizer, etc.) or is not in an inking state, that is, when the pen is just hovering over the screen of the digitizer. Additionally, determining the amount of pressure applied at the tip of the pen may determine the characteristics of an application, e.g., a graphic application may adjust line thickness or shade of a drawn line based on amount of force detected at the tip of the pen. That is, at low forces it is preferable to have more accuracy in the sensitivity to more clearly distinguish over possible errors that would have the pen in the inking state when it should not be and vice versa.

One implementation relates to a method of increasing low-force accuracy at a device for communicating with a digitizer. The method may include detecting, by a pressure sensor in the device, an amount of force at the tip of the device; generating, by the pressure sensor, a voltage associated with the amount of force; logarithmically sampling the voltage to produce a digital value associated with the amount of force; and determining whether the device is operating in an inking state based on the digital value.

In another implementation, a device for increasing low-force accuracy at a device for communicating with a digitizer may include a pressure sensor configured to detect an amount of force at the tip of the device and generate a voltage associated with the amount of force; a sampling circuit configured to logarithmically sample the voltage to produce a digital value associated with the amount of force; a memory; and a processor in communication with the memory, wherein the processor is configured to determine whether the device is operating in an inking state based on the digital value.

Additional advantages and novel features relating to features of the present disclosure will be set forth in part in the description that follows, and in part will become more apparent to those skilled in the art upon examination of the following or upon learning by practice thereof.

DETAILED DESCRIPTION

The present disclosure provides a method and/or a device for increasing low-force accuracy for communicating with a digitizer. The device (e.g., a pen or a stylus) increases low-force accuracy by detecting an amount of force at the tip of the device and generating a voltage associated with the amount of force. The device further performs logarithmically sampling of the voltage to produce a digital value associated with the amount of force and determining whether the device is operating in an inking state based on the digital value.

In one implementation, the device performs the logarithmic sampling by amplifying the voltage by a linear amplifier and sampling the amplified voltage by a logarithmic analogto-digital converter (ADC) to produce the digital value. In another implementation, the device performs the logarithmic sampling by amplifying the voltage by a logarithmic amplifier and sampling the amplified voltage by a linear analog-to-digital converter (ADC) to produce the digital value. The digital value is compared with a threshold value and the device determines that the pen is in an inking state when the digital value is equal to or greater than the threshold value. However, the errors due to the quantization of the voltage at low-forces may lead to an ADC value greater than the threshold in instances when it is not. It is only by having a very fine quantization at low-forces that this issue can be avoided. The tradeoff would have much larger quantization at higher forces which does not affect the performance of the pen and/or the communications with the digitizer as the amount of force to transition the pen to an inking state is in the low-forces.

Figure 1:
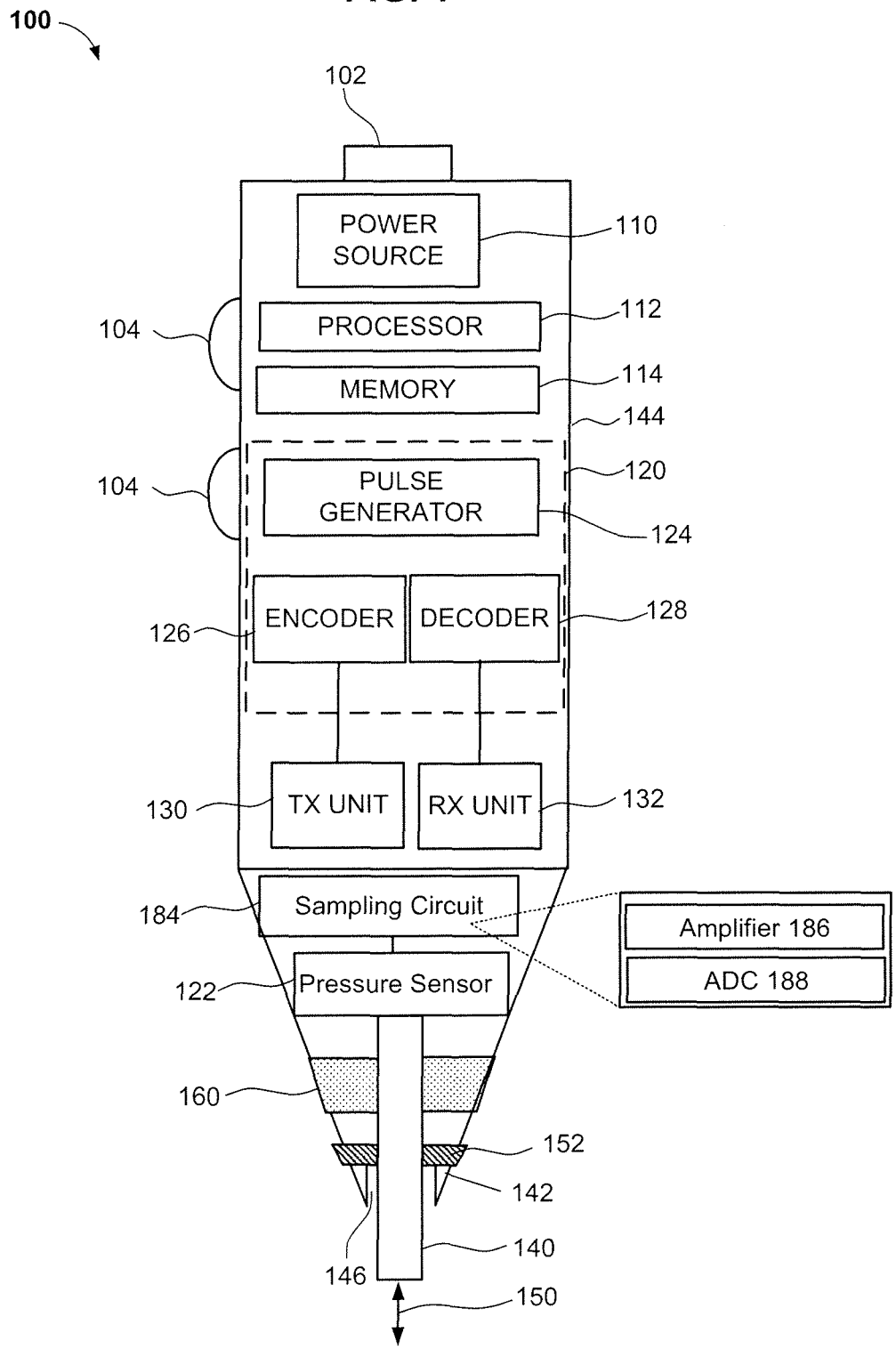
FIG. 1 is a schematic view of an example of a pen.

Referring to FIG. 1, according to an example implementation, a pen 100 (which may also be referred to as a stylus) may be an autonomous asynchronous device that can communicate or interact with a digitizer, for example, to transmit data to the digitizer and/or receive data from the digitizer. The pen 100 can transmit pulses of energy that can represent beacon signals and/or commands generated by the pen 100. For example, a transmitting unit (TX unit) 130 of the pen 100 may transmit an electric signal generated by a pulse generator 124. In some cases, the pulse generator 124 generates one or more AC signal bursts providing pulsed signals (AC pulses), e.g., a train of pulses (signal bursts). For example, the AC pulses may be generated within a certain frequency range, such as but not limited to a frequency range between 20 KHz-2 MHz. The AC pulses may use a frequency other than the frequencies generally used to detect finger touch on a digitizer. Additionally, for example, the frequency of a burst signal from the pen 100 may be orthogonal to the frequencies used to detect finger touch in the sampling space or far enough away so that simultaneous user interactions (e.g., pen and finger) may be possible. Also, in some implementations, specific time slots for finger touch detection and pen detection may be defined to avoid interference or misidentification when close frequencies are used. In some cases, the pulse generator 124 generates pulses over a defined time duration or pulse width. An example pulse width may be between 1-2 milliseconds (msec), such as but not limited to 1.28 msec. In some additional implementations, for example, the pen 100 can receive an electrical signal which may include information received and processed by a receiving unit (RX unit) 132.

The TX unit 130 can transmit data to the digitizer and/or the RX unit 132 can receive data from the digitizer via an electrode 160 and/or tip 140. In one example, the TX unit 130 and the RX unit 132 can transmit/receive over a single electrode, e.g., electrode 160 or the tip 140, in a time division multiplexing (TDM) manner. In another example, the TX unit 130 can transmit data over one electrode (e.g., a first electrode) and receive data over a different electrode (e.g., a second electrode). However, depending on the configuration of the pen 100 and the digitizer, the TX unit 130 and the RX unit 132 can communicate with the digitizer over the first electrode and the second electrode in a TDM manner or at the same time (e.g., simultaneously).

The pen 100 may include a processor 112, a memory 114, and powered by a power source 110. The power source 110 may include one or more batteries, e.g., alkaline or rechargeable batteries.

In some cases, the pen 100 may include a power switch 102 for powering transmission of the pen 100 and one or more operational switches and/or dials 104 for receiving operation commands from a user. For instance, the switches 104 may control right click and eraser mode commands as well as color selection when writing or drawing with the pen. In some other additional or optional implementations, a rocker switch may be used for right click or eraser operation. That is, at least one of the switches 104 may be a rocker switch.

The pen 100 may include a tip 140 that operates as an antenna of the TX unit 130, and/or an electric dipole, and/or the tip 140 may be used to transmit/receive data to/from the digitizer. For example, the tip 140 may transmit beacons for tracking the position of the pen 100 and pressure information. For example, one output of the pulse generator 124 is electrically connected to the pen tip 140 (which may be constructed from a conductive material) while the other end is electrically connected to a frame 142 (which may comprise conductive material) surrounding the tip 140. The frame 142 may be integral to a housing unit 144 and is grounded. An electric field, synchronized to a generated signal pulse, may be formed in a small gap 146 located between the tip 140 and the frame 142. In some implementations, the geometric dimensions of the gap and the consequent electric field may be relatively small so that field source may be substantially close to the pen tip and may provide a concentrated signal at the tip. Further, the signals transmitted by the pen 100 may be picked up at relatively concentrated points by the digitizer or other sensing surface and the position of the pen at that position may be conveyed to the digitizer. In some other optional implementations, the pen 100 may include a separate antenna and may not use the tip 140 for transmitting the output signals.

The pen 100 may be a pressure sensitive pen that may transmit information regarding contact pressure applied to the tip 140. For instance, the pen 100 may include a pressure sensor 122 in communication with the tip 140 and configured to detect contact force (or contact pressure) applied to the tip 140. In some cases, the tip 140 may be fixedly connected to the pen 100, while in other cases, the tip 140 is movably connected to the pen 100 to allow the tip 140 to translate in the axial direction 150, e.g., along the longitudinal axis of the tip 140. For example, in the movably connected cases, the tip 140 recedes into the housing unit 144 along an axial direction 150 in response to a user pressing the tip 140 on a surface, and the tip 140 may move in a direction away from the housing unit 144 when the contact pressure is released, e.g., in a hovering state or non-operational state of the pen 100. In some cases, during the axial movement, the tip 140 is engaged with a resilient element 152, e.g., a spring whose properties are generally selected to obtain a desired relationship between the contact pressure and the axial displacement.

Pressure sensor 122 senses contact pressure applied to the tip 140 and provides this pressure information to pulse generator 124. The pulse generator 124, based on the sensed contact pressure level, defines or alters a frequency of a pulse, and generates and initiates transmission of the defined or the altered pulse. In some other additional or optional cases, a specific frequency band may be allocated for transmitting the pressure information. For example, a frequency band of 20-45 KHz, e.g., 20-25 KHz, may be allocated for transmitting the pressure information. Additionally, output from the pressure sensor 122 may be encoded with an encoder 126 for the pulses generated by pulse generator 124. The pressure sensor 122 may be a strain gauge sensor, a microelectromechanical systems (MEMS) sensor, or a capacitive force sensor. In one implementation, the pressure sensor 182 may be connected to a sampling circuit 184 which may further include an amplifier 186 (e.g., linear amplifier/logarithmic amplifier) and an analog-to-digital converter (ADC) (e.g., logarithmic ADC/linear ADC) 188 to logarithmically sample a voltage generated by the pressure sensor 182 to produce a digital value associated with the amount of force.

The pen 100 may include an encoder 126, such as but not limited to a digital encoder, operable to encode an operational state of the pen 100 and/or identification information of the pen 100 into a pulse generated by the pulse generator 124. The operational state of the pen 100 may be obtained from switch state of the switches 102, and/or the pressure state of the pen 100 may be encoded with the encoder 126. One or more encoding methods (e.g., Amplitude Shift Keying (ASK), Phase Shift Keying (PSK), Frequency Shift Keying (FSK), etc.) may be used to encode information with the encoder 126. The encoded information from the pen may be transmitted over a plurality of transmission cycles. For instance, in some implementations, one bit of encoded information may be transmitted per transmission cycle. In some other implementations, the pulse generator 124, the encoder 126, the pressure sensor 122, and/or their functionality may be embedded in an ASIC unit 120. In addition, the pen 100 may include a decoder 166, such as but not limited to a digital decoder, operable to decode a digital stream from the RX unit 132 into the second information, and pass on the second information to the processor 112 for processing.

In some cases, a time between pulses may match a refresh cycle of a digitizer or an integer multiple of a refresh cycle of a digitizer, e.g., twice a refresh cycle of a digitizer and/or three or four times a refresh frequency of a digitizer. Alternatively or in addition, a time between pulses (or bursts) may be variable and may be controllably altered based on an operational state of the digitizer. For instance, in an implementation, the time between pulses at the pen 100 may be configured for 15 msec.

Figure 2:
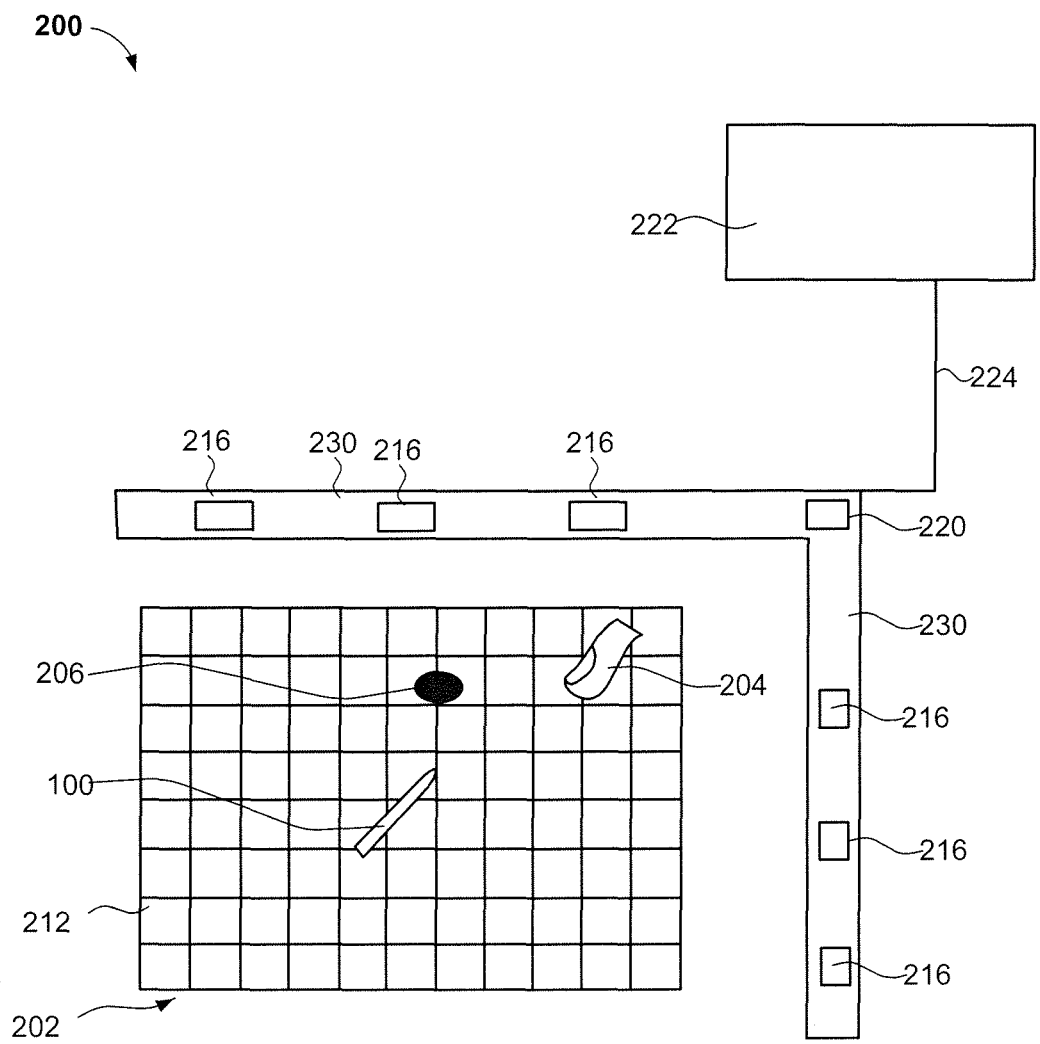
FIG. 2 is a schematic view of an example of a digitizer system for use with the pen of FIG. 1.

Referring to FIG. 2, according to an example implementation, a digitizer system or digitizer 200 may be used with any computing device to enable communications/interactions between a user and a device, e.g., personal computers (PCs), tablets, pen enabled lap-top computers, PDAs, mobile devices/user equipments (UEs), etc. In some implementations, the digitizer system 200 is part of a user interface operative to detect inputs from one or more pens 100, fingers 204, and/or conductive objects 206 and/or send outputs to one or more pens 100. The digitizer 200 may operate in a pen search mode or a pen tracking mode. In a pen search mode, the digitizer 200 may search for a signal from the pen 100, perform synchronization with the signal transmitted from the pen 100 when the signal from the pen 100 is detected or when the pen 100 comes in contact with the digitizer 200, and/or enter the tracking mode upon successful completion of the synchronization with the pen 100. The digitizer 200 remains in the tracking mode while the pen 100 maintains contact with the digitizer 200 or continues to receive the signal from the pen 100.

The digitizer system 200 may include a sensor 212 including a patterned arrangement of conductive lines (sensor lines), which may be optionally transparent, and which are typically overlaid on a display 202. For example, the sensor 212 may be a grid based sensor including horizontal and vertical lines. In some cases, a width of the conductive line may vary over its length, e.g., the width of the conductive line may be narrower around the vicinity of junction points of the grid and wider between the junction points. In some cases, the conductive lines may be shaped like a diamond shape array with diamond points matched to junction points. In some implementations, the parallel conductive lines are equally spaced straight lines, and are input to amplifiers included in application specific integrated circuit (ASIC) 216. For example, the amplifiers may be differential amplifiers.

The ASIC 216 includes, for example, circuitry to process and sample an output of the sensor and generate a digital representation. The digital output signal is forwarded to a digital unit 220, e.g., a digital ASIC unit, for further digital processing. For instance, the digital unit 220 together with the ASIC 216 may serve as a controller of the digitizer system 200 and/or may have the functionality of a controller and/or a processor. In some cases, a single unit may be used, e.g., in a small screen with limited number of lines. In some other additional or optional implementations, the ASIC 216 operates as a detection unit for processing and sampling the output of the sensor. The outcome, once determined, is forwarded to a host 222, e.g., a computer device or a host computer device, via an interface 224 for processing by the operating system or any current application. In some other cases, control functionality may be additionally or exclusively included in the host 222, and the ASIC 216 and the digital unit 220 may be provided as a single ASIC. In some other optional implementations, the digital unit 220 and the ASICs 216 may be mounted in a PCB 230.

The ASIC 216 may be connected to the outputs of the various conductive lines in the grid and functions to process the received signals at a first processing stage. In some cases, instead of the printed circuit board (PCB) 230 positioned along two sides of the sensor 212, a flex cable may be used to connect the conductive lines to the ASICs 216, e.g., positioned away from a sensing surface of the digitizer 200. As indicated above, the ASIC 216 may include one or more arrays of amplifiers, e.g., an array of differential amplifiers, an array of single ended amplifiers, or any array of differential amplifiers, and optionally including one grounded input to amplify the sensor's signals. In some other additional or optional implementations, the grounding input may be selected by the ASIC 216. The ASIC 216 may optionally include one or more filters to remove irrelevant frequencies. Additionally, filtering is performed prior to sampling. The signal is then sampled by an analog-to-digital (A/D) converter, optionally filtered by a digital filter and forwarded to digital ASIC unit, for further digital processing. Alternatively, the optional filtering is fully digital or fully analog.

For instance, the digital unit 220 receives the sampled data from the ASIC 216, reads the sampled data, processes it and determines and/or tracks the position of physical objects, such as the pen 100 and/or the finger 204, touching the digitizer sensor the 212. Further, for example, the digital unit 220 is operative to decode information encoded in a transmission signal from the pen 100, e.g., pressure on tip, right-click and/or eraser mode, color for tracing, and identification, etc. According to some implementations, hovering of an object, e.g., the pen 100, the finger 204 and/or the hand, may be detected and processed by the digital unit 220. In any case, the digital unit 220 can send a calculated position to the host 222 via an interface 224.

In some implementations, the digitizer system or digitizer 200 has several channels, i.e., interfaces included within the interface 224, with the host. In an example, the interface 224 includes a pen interface for transmitting pen coordinates on the display screen, and a finger touch interface for transmitting finger touch coordinates on the display screen. In some additional examples, a same interface of the interface 224 may transmit finger touch coordinates based on both single touch detection method and multi-touch detection method. Optionally, the interface 224 may transmit information on detected gestures.

Further, the digital unit 220 may be operative to control operation of one or more ASIC(s) 216. For instance, the digital unit 220 may be operative to provide a command signal to the ASIC 216 to switch between a plurality of available circuit paths (two or more) to connect to outputs of the various conductive lines in the grid. In some cases, the digital unit 220 together with the ASIC 216 provides for alternately connecting outputs of the various conductors to one of an array of differential amplifiers and an array of single ended amplifiers (or differential amplifiers with one grounded input). In other cases, the digital unit 220 may be operative to control triggering of one or more conductive lines. In other examples, the ASIC 216 together with the digital unit 220 provide for triggering various conductors with an oscillating signal having a selected pre-defined frequency or frequencies.

The digital unit 220 may include at least a memory unit and a processing unit to store and process information obtained from the ASIC 216. Memory and processing capability are also generally included in the host 222 and the ASIC 126. According to some implementations, memory and processing functionality may be divided between any combination of the host 222, the digital unit 220, and/or the ASIC 216. The pen 100, described above in FIG. 1 may communicate/interact with the digitizer 200 of FIG. 2 over an electrode 160 or the tip 140. However, the pen 100 should be able to correctly determine the amount of force at the tip 140 of the pen 100 to determine whether the pen is an inking state. Otherwise, it would result in the pen 100 operating in the inking state when it should not be operating in the inking state. The digitizer 200 may also transmit signals, for example, initiated by the host 222 or the ASIC 216, to the pen 100 via the conductive lines.

Figure 3A:
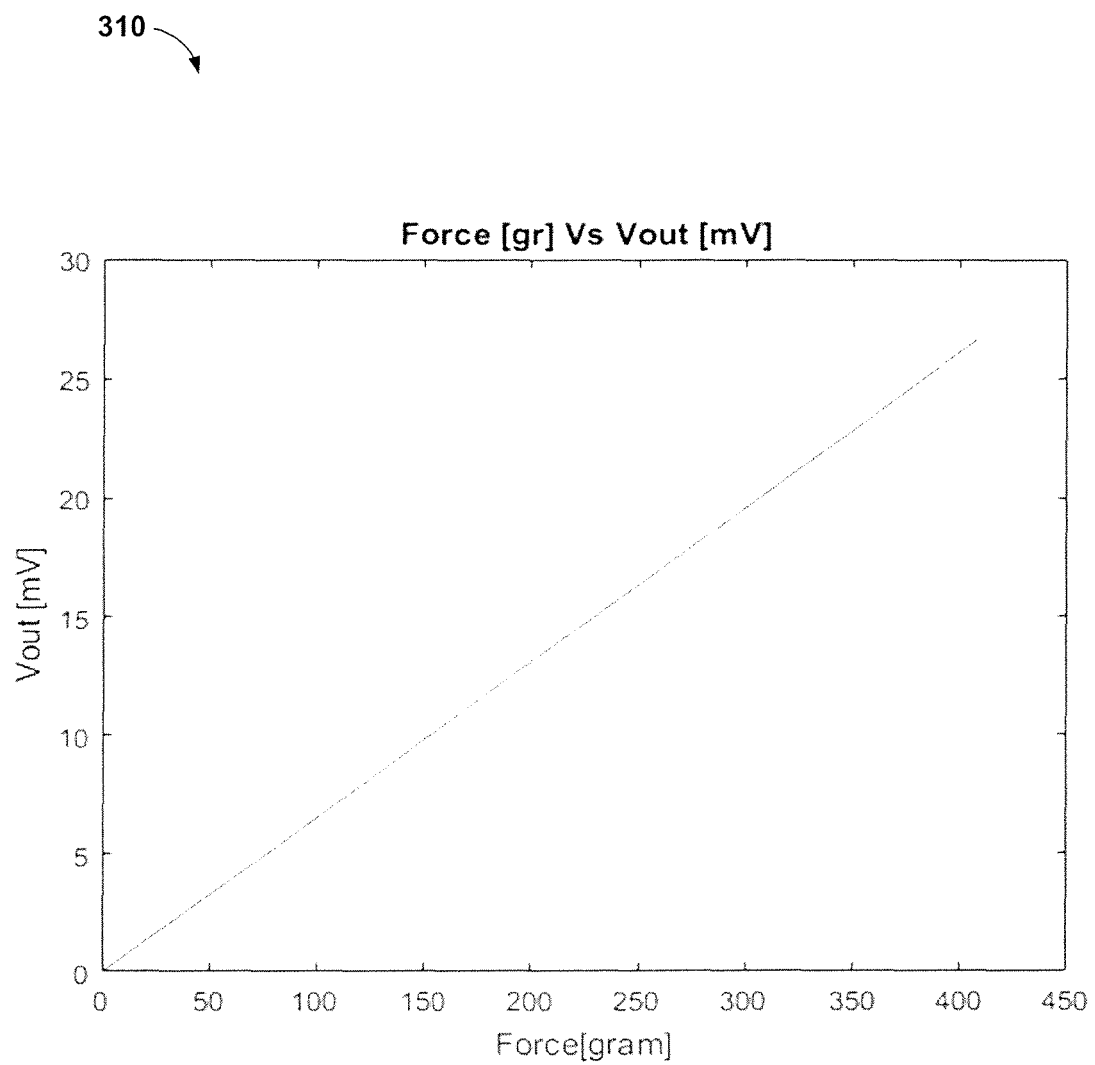
FIG. 3A illustrates a graph of a linear curve between force (grams) and output voltage (Vout, mV).

FIG. 3A illustrates an example graph 310 with force (in grams) on the x-axis and output voltage, Vout (in millivolts, mV), on the y-axis. The graph 310 shows a linear curve representing same (or uniform) sensitivity of a pressure sensor, e.g., a strain gauge sensor, throughout the entire force range. In other words, the slope of the curve is the same throughout the entire force range, e.g., at low-forces and high-forces. That is, a ratio of Vout/Force remains the same throughout the entire force range. However, for pen applications, e.g., determining when the pen 100 is an inking state and/or better user experience, uniform sensitivity over the entire force range is not preferred and/or not optimal as the pen applications require high sensitivity in the low-force range to correctly determine the amount of force at the tip of the pen and/or whether the pen is in an inking state as users are more sensitive in the low force range.

Figure 3B:
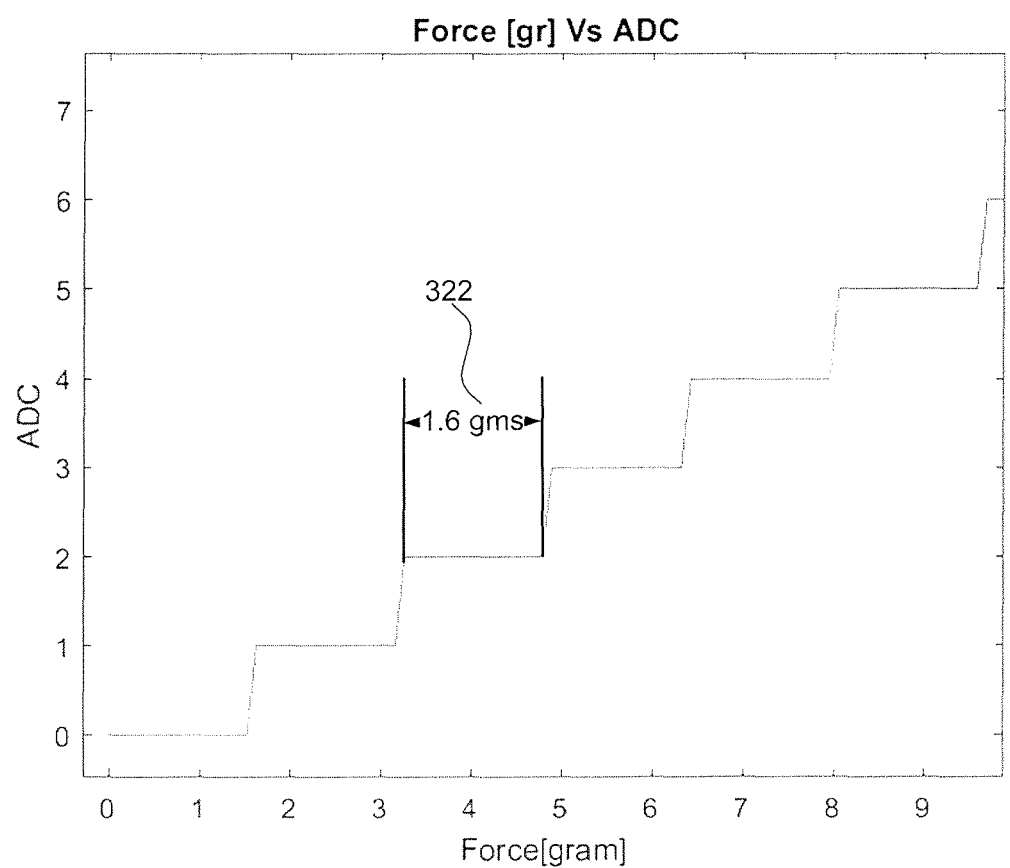
FIG. 3B illustrates a graph of evenly distributed analog-to-digital converter (ADC) levels.

FIG. 3B illustrates an additional graph 320 with force (in grams) on the x-axis and ADC values on the y-axis. As illustrated in FIG. 3B, consecutive ADC values may be separated by 1.6 grams in the low-force range. Each ADC value represents a discrete-time and discrete-amplitude digital signal. Although FIG. 3B shows Force vs ADC in the low-force range, the graph 320 is also valid for high-force range as the ADC values are evenly distributed as a linear ADC is used along with a linear amplifier, for example, 256 evenly distributed levels. In one example, each ADC value may correspond to a range of 1.6 grams of force as shown by 322. That is, the quantization error may be in the range of 1.6 grams as each ADC value covers a range of 1.6 grams of force which may result in low accuracy at the low-force range if there is a need for higher sensitivity, for example, to determine whether the pen is an inking state as the activation force is in the low-force range.

Therefore, there is a need for a mechanism to improve accuracy, especially, at the low-force range, e.g., improve low-force accuracy.

Figure 4A:
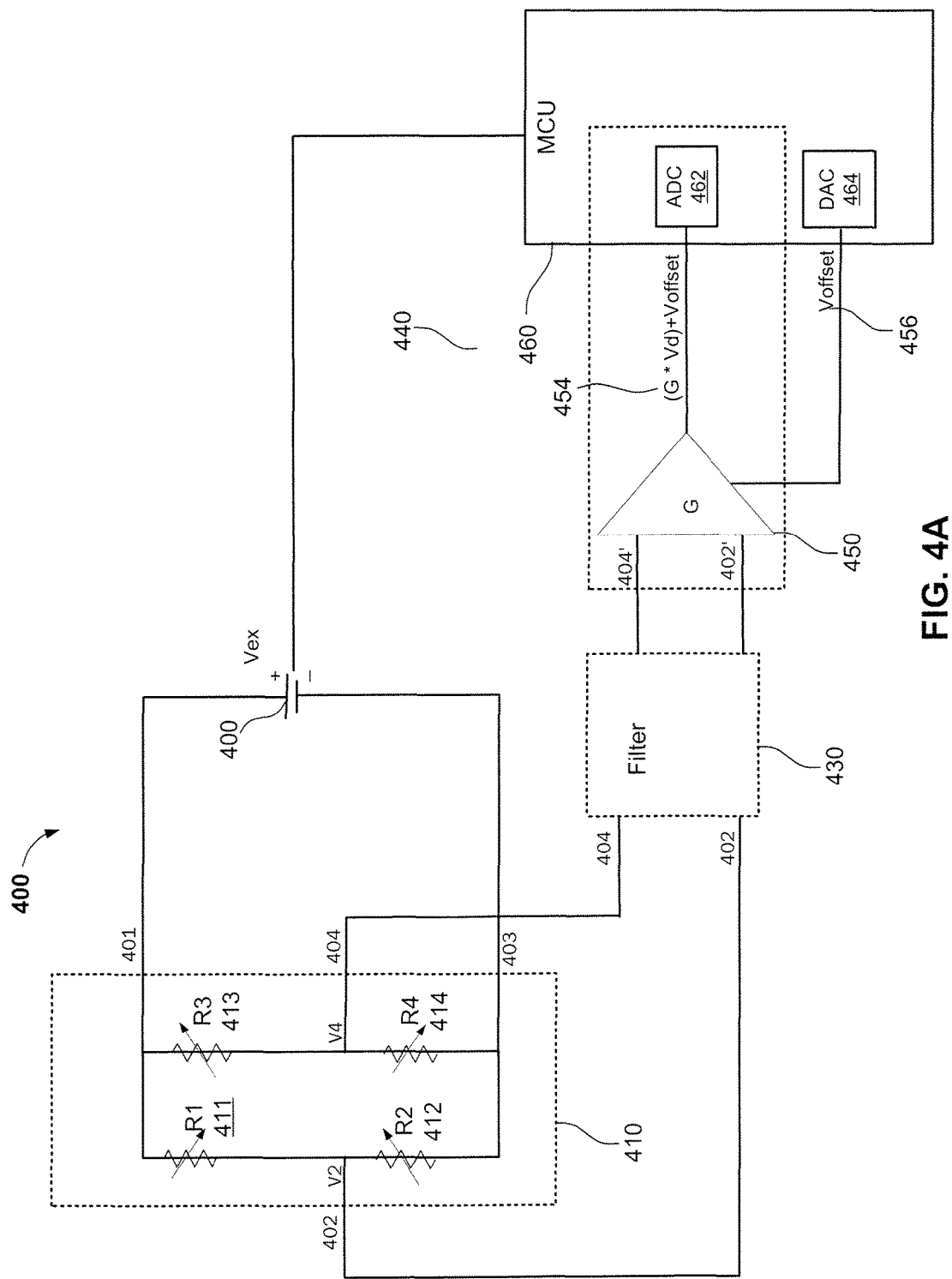
FIGS. 4A-4B are block diagrams of example pens with a pressure sensor and/or a sampling circuit in aspects of the present disclosure.

FIG. 4A illustrates an example apparatus 400 for increasing low-force accuracy at the pen 100. For example, the apparatus 400 may include a pressure sensor 410 which may be same or similar to pressure sensor 122 of FIG. 1 and/or a sampling circuit 440 which may include an amplifier 450 and/or an ADC 462. The sampling circuit 440, the amplifier 450, and/or the ADC 462 may be same or similar to the sampling circuit 184, the amplifier 186, and/or the ADC 188 of FIG. 1. The sampling circuit 440 may optionally include a filter 430 and/or parts of a microcontroller 460 and/or a DAC 464 for increasing low-force accuracy at the pen 100.

In one implementation, the pressure sensor 410 may be a strain gauge sensor which may include four strain gauge elements, e.g., variable resistors R1 (411), R2 (412), R3 (413), and/or R4 (414), that are electrically connected to form a Wheatstone bridge. A Wheatstone bridge may be a divided bridge circuit that measures static or dynamic electrical resistance and measures differential voltages, e.g., measures voltages 404 and 402 at points $V_4$ and $V_2$, respectively.

The voltages 404 and 402 may be sent through a filter 430 to filter out any analog noises and produce output voltages 404' and 402' that respectively correspond to the voltages 404 and 402. The voltages 404' and 402' are provided as input to an amplifier 450, e.g., a linear differential amplifier, to amplify the difference between the voltages 404' and 402'. In one example, the linear amplifier 450 calculates the differential voltage, Vd 452 as $V_4$-$V_2$ (e.g., 404'-402'), amplifies the differential voltage Vd 452 by a factor of G (e.g., multiplies by a factor of G), and adds an offset, Voffset, to obtain an output voltage 454 of the linear amplifier 450. The output voltage 454 is provided as an input to a logarithmic ADC 462 which outputs a digital value. As the ADC 462 is a logarithmic ADC any small changes in the output voltage 454 may lead to a different ADC value as the apparatus 400 is sensitive in the low-force range as described below in detail in reference to FIGS. 5A and 5B.

For example, the pressure sensor (or strain gauge sensor) 410 may detect $V_4$ as 0.4 mV and $V_2$ as 0.2 mV. The differential voltage Vd may be calculated as 0.2 mV. With a gain (G) of 2 and a Voffset of 0.1 mV, a value of 0.5 mV ((2*0.2)+0.1) may be provided as input to the logarithmic ADC 462. The logarithmic ADC 462 may output an ADC value of 2 which is compared to a threshold inking value to determine whether the pen 100 is in an inking state. For example, the pen 100 may be detected to be in an inking state if the ADC value is greater than a threshold value. In one implementation, the threshold value may be set by the user, or the manufacturer of the pen 100, and/or by either based on an application type. For example, in one implementation, the threshold value may be 0.5-1.0 gram which is similar to inking force of a pencil to allow pencil like behavior such as shadowing. In another implementation, the threshold value may be 3-4 grams which is similar to inking force of normal writing to provide good user experience. In a further additional implementation, the threshold value may be set to a value between the example threshold values described above or customized as needed. By using the linear amplifier 450 and/or a logarithmic ADC 462, the apparatus 400 improves accuracy at the low-force range.

For example, the microcontroller 460 may include the ADC 462 and the DAC 464. In one implementation, the ADC 462 may an 8-bit logarithmic ADC which can provide 256 (e.g., $2^8$) unique ADC values. That is, the ADC 462 may provide 256 logarithmic levels. By using the 8-bit logarithmic ADC 462, 256 ADC digital values are produced to provide accuracy in the low force range which is similar to accuracy provided by a linear 10-bit ADC. Further, the 8-bit ADC 462, in one example implementation, may provide 0.2 grams of quantization error in the low-force range to improve accuracy in the low-force range.

In another implementations the pressure sensor 122 may be a microelectromechanical system (MEMS) sensor, a capacitive force sensor, or any other type of force sensor that could detect the pressure applied at the tip 140 of the pen 100 and output a voltage.

Figure 4B:
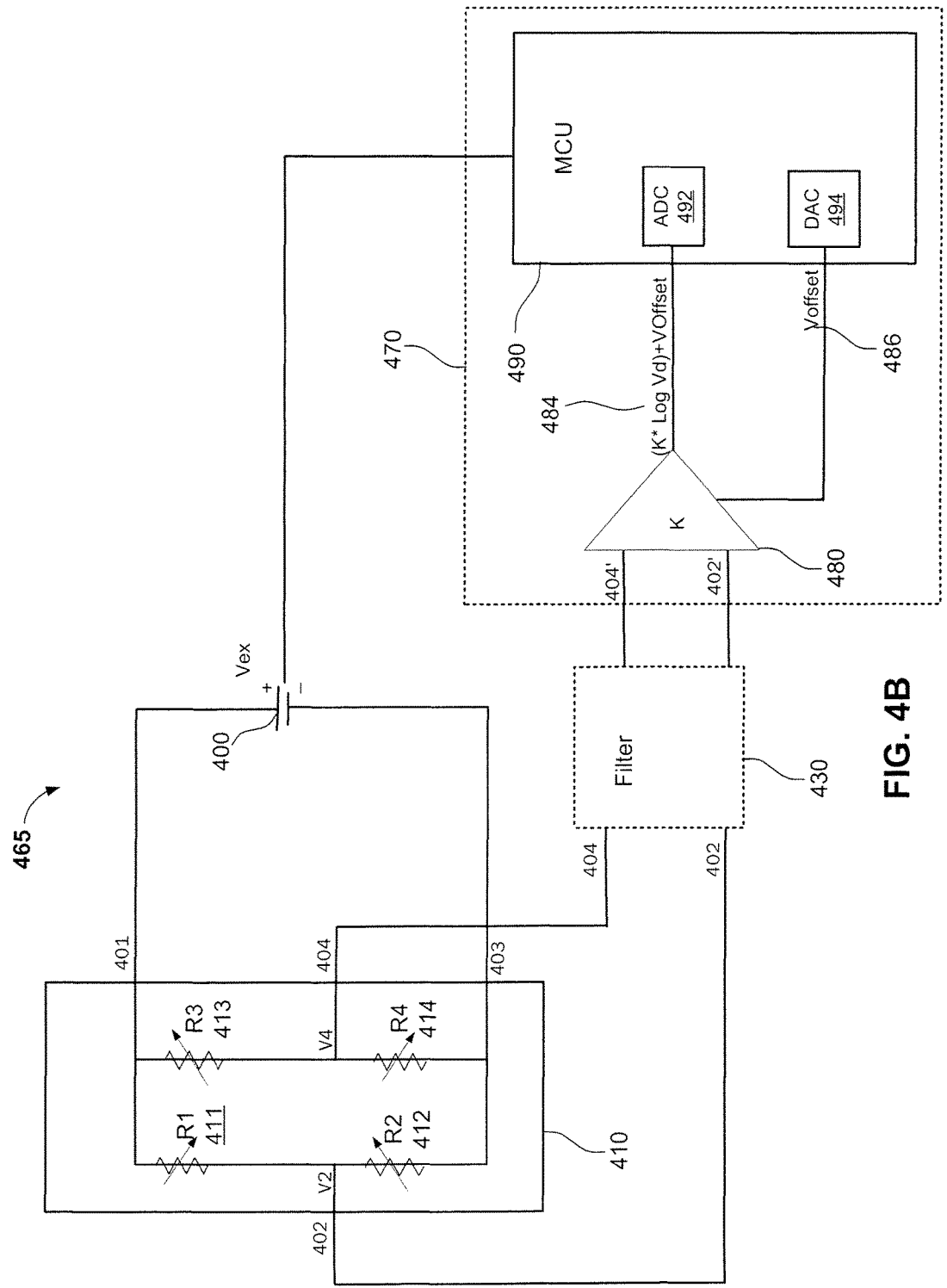

FIG. 4B illustrates an example apparatus 465 for increasing low-force accuracy at the pen 100. For example, the apparatus 465 may include a pressure sensor 410 which may be same or similar to pressure sensor 122 of FIG. 1 and/or a sampling circuit 470 which may include a logarithmic amplifier 480 and/or an ADC 492. The sampling circuit 470, the logarithmic amplifier 480, and/or the ADC 492 may be same or similar to the sampling circuit 184, the amplifier 186, and/or the ADC 188 of FIG. 1. The sampling circuit 470 may optionally include a filter 430 and/or parts of a microcontroller 490 and/or a DAC 494 for increasing low-force accuracy at the pen 100.

The voltages 404 and 402 may be sent through a filter 430 to filter out any analog noises and produce output voltages 404' and 402' that respectively correspond to the voltages 404 and 402. The voltages 404' and 402' are provided as input to the logarithmic amplifier 480 (e.g., a logarithmic differential amplifier) to amplify the difference between the voltages 404' and 402'. In one example, the logarithmic amplifier 480 calculates the differential voltage Vd 482 as $V_4$-$V_2$ (e.g., 404'-402'), amplifies a logarithmic value of the differential voltage Vd 482, and adds an offset, Voffset, to obtain an output voltage, Vo 484, of the logarithmic amplifier 480. The output voltage Vo 484 is provided as an input to a linear ADC 492 which outputs a digital value. As the amplifier 480 is a logarithmic amplifier, any small changes in the differential voltage may result in changes to ADC values especially in the low-force range as described below in detail in reference to FIGS. 5A and 5B.

For example, the microcontroller 490 may include the ADC 492 and the DAC 494. The ADC 492 may an 8-bit ADC which can provide 256 (e.g., $2^8$) unique ADC values. That is ADC 492 may provide 256 levels. By using the 8-bit ADC 492, 256 ADC digital values are produced. Further, the 8-bit ADC 462, in one example implementation, may provide 0.2 grams of quantization error in the low-force range to improve accuracy in the low-force range.

Figure 5A:
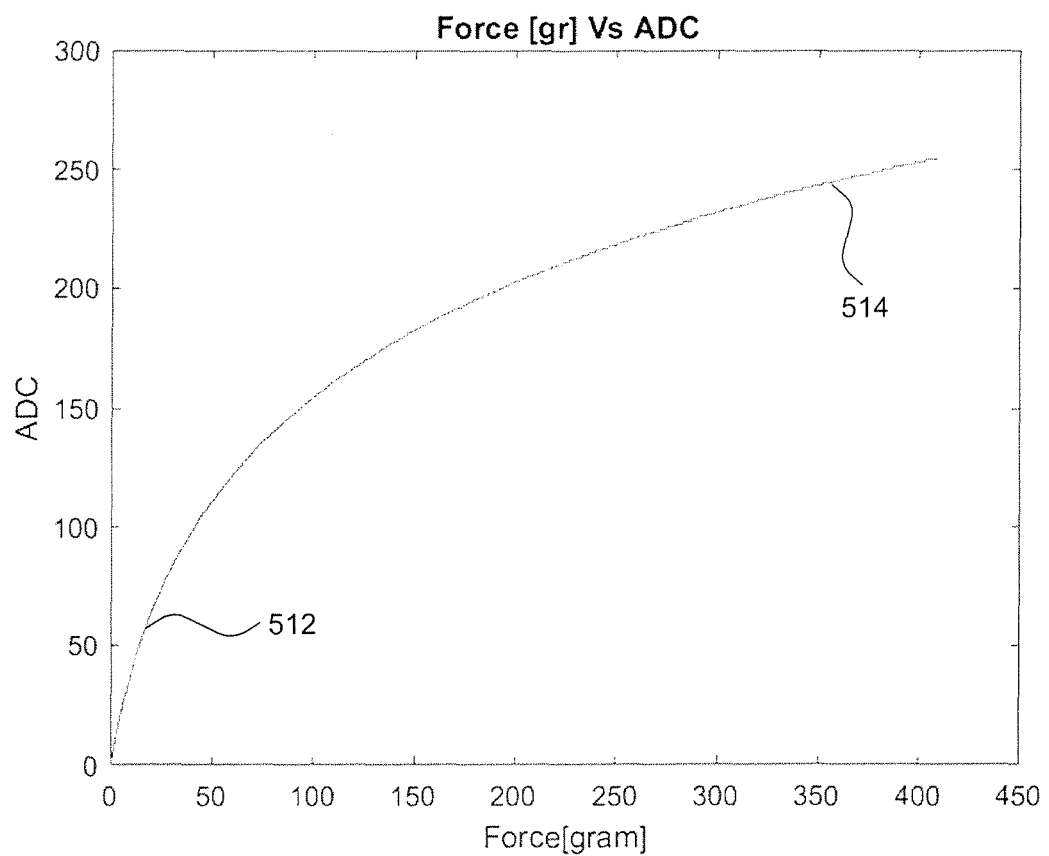
FIG. 5A illustrates a graph of a logarithmic relationship between force (grams) and ADC levels in aspects of the present disclosure.

FIG. 5A illustrates an example graph 510 with force (in grams) on the x-axis and ADC values on the y-axis. For example, the graph 510 shows a curve with a higher slope (e.g., change in ADC values/change in force) at lower-forces and/or a lower slope at higher forces. For example, 512 represents a portion of the graph with a higher slope in the low-force range and/or 514 represents a portion of the graph with a lower slope in the high-force range. In other words, the graph 510 is more sensitive (and more accurate) at low-force range (described below in detail in reference to FIG. 5B) and not as sensitive at high-force range (described below in detail in reference to FIG. 5C). The increased accuracy at low-force range may also assist the pen 100 to accurately determine whether the pen 100 is in an inking state as the amount of force to determine whether the pen 100 is in an inking state is in the low-force range.

Figure 5B:
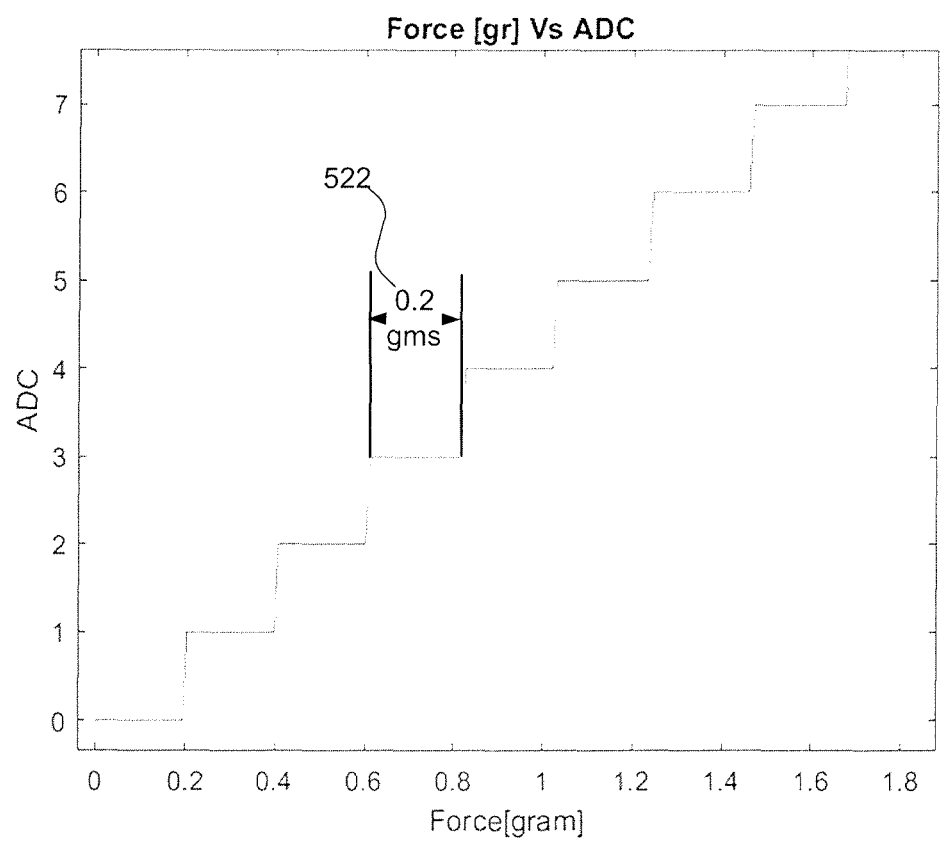
FIGS. 5B-5C illustrates a graph of unevenly distributed analog-to-digital converter (ADC) level in aspects of the present disclosure.

FIG. 5B illustrates an additional graph 520 with force (in grams) on x-axis and ADC values on y-axis, in the low-forces range. As illustrated in FIG. 5B, consecutive ADC values may be separated by 0.2 grams in the low-force range. For example, each ADC value may correspond to a range of 0.2 grams of force in the low-force range as shown by 522. That is, the quantization error is in the range of 0.2 grams in the low-force range. This may result in high or improved accuracy in the low-forces range as more accurate ADC values may be assigned when compared to FIG. 3B. For instance, an ADC value of 7 may be associated with 1.6 grams of force as per FIG. 5B. In contrast, an ADC value of 0 or 1 may be associated with 1.6 grams of force. Therefore, graph 520 based on use of a sampling circuit as described in detail in reference to FIGS. 4A and 4B provides much more accuracy at low-force range.

Figure 5C:
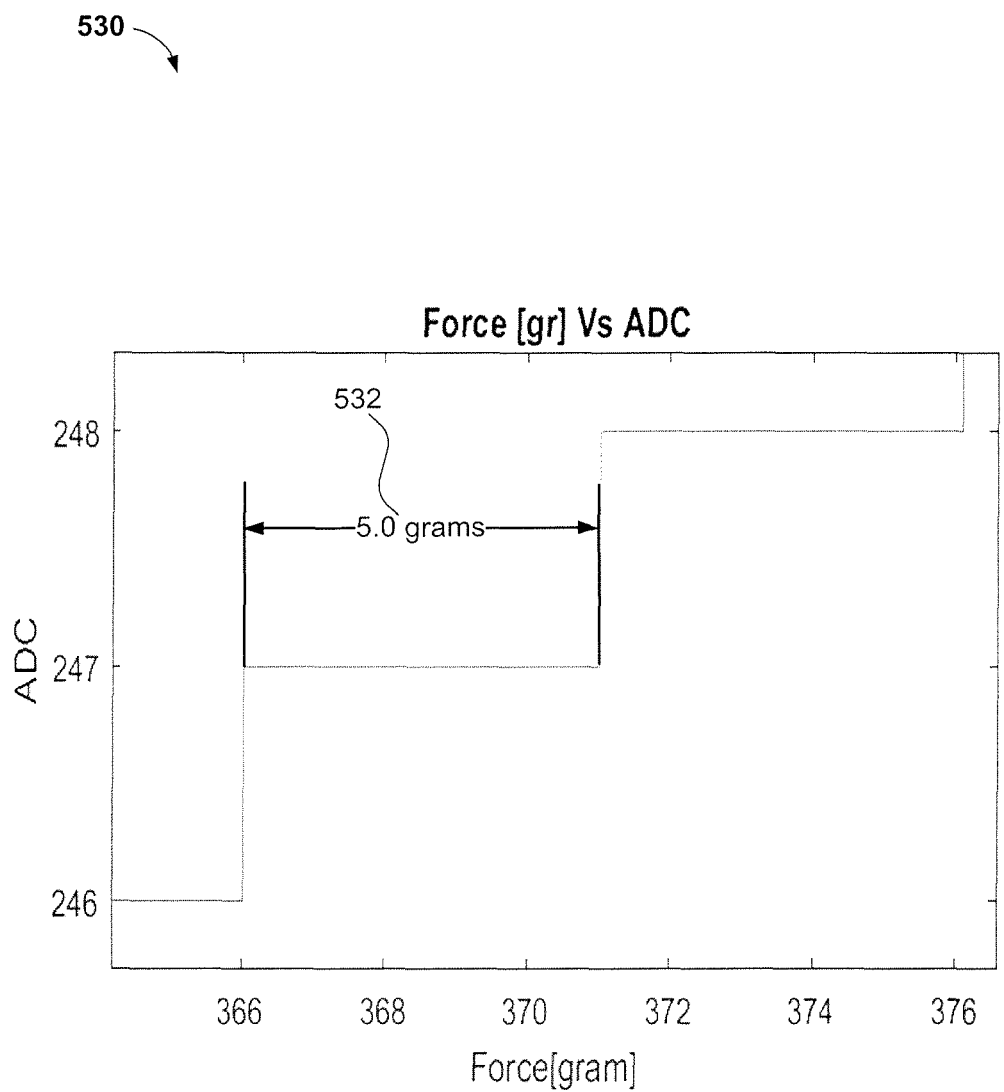

FIG. 5C illustrates a further additional graph 530 with force (in grams) on x-axis and ADC values on y-axis in the high-force range. As illustrated in FIG. 5C, consecutive ADC values may be separated by 5 grams in the high-force range. For example, each ADC value may correspond to a range of 5 grams of force in the high-force range as shown by 532. That is the quantization error is in the range of 5.0 grams in the high-force range. This may result in low accuracy in the high-force range. However, the performance of the pen 100, e.g., detecting whether the pen is in the inking state, may not be affected as the user of the pen 100 is not as sensitive in the high-force range as the inking is activated (or inking activation force) in the low-force range.

Figure 6:
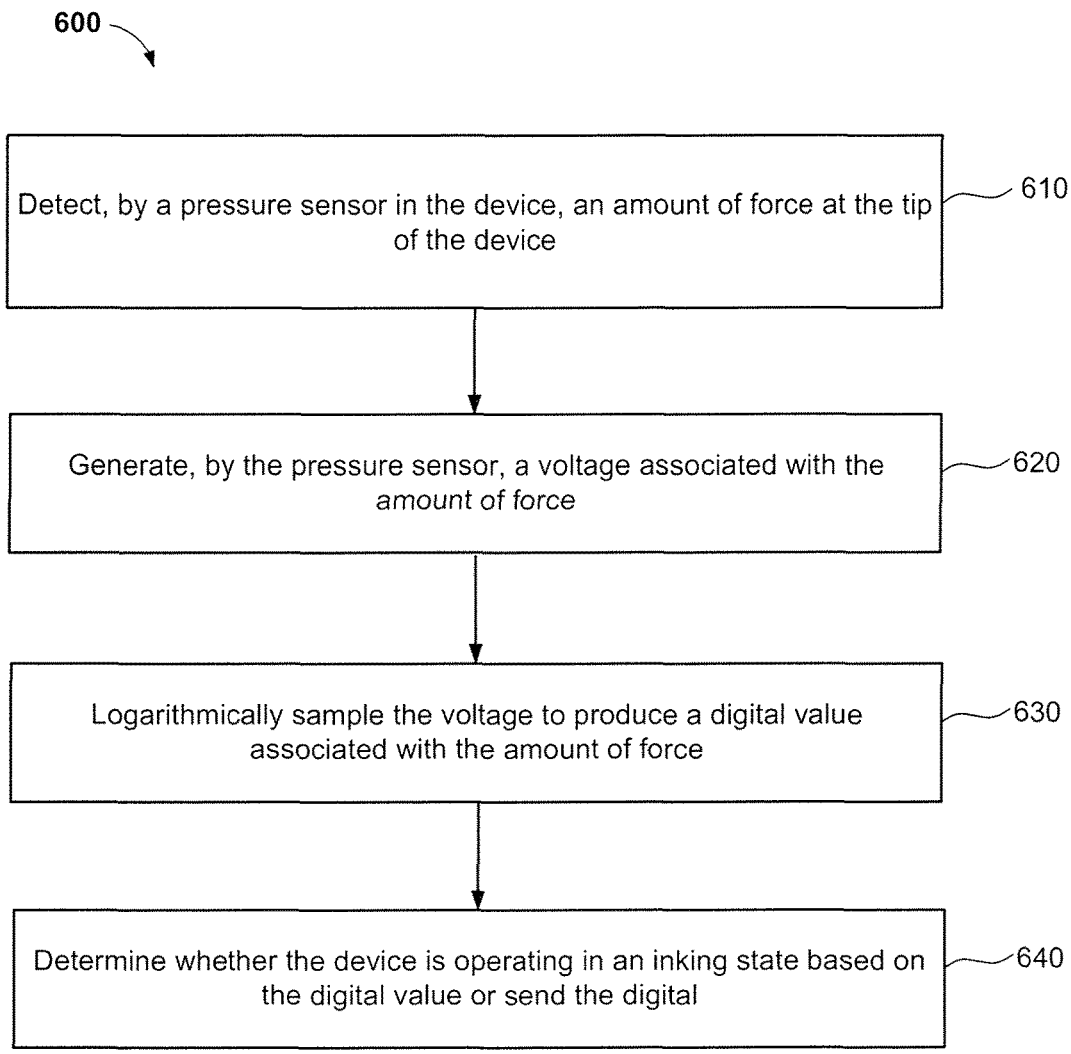
FIG. 6 is a flowchart of an example method of the operation of a pen, including a method of communicating with the digitizer.

Referring to FIG. 6, an example of a method 600 performed by the pen 100 for increasing low-force accuracy at the pen 100 for communicating with the digitizer 200 is described.

For example, at block 610, method 600 includes detecting, by a pressure sensor in the device, an amount of force at the tip of the device. For example, the pressure sensor 122 may detect the amount of force at the tip 140 of the pen 100. The pressure sensor 122 may be any type of a pressure sensor, e.g., a strain gauge sensor, a microelectromechanical (MEMS) sensor, a capacitive force sensor, etc.

At block 620, method 600 further includes generating, by the pressure sensor, a voltage associated with the amount of force. For example, the pressure sensor 122 may generate a voltage which is a differential voltage produced by the strain gauge sensor 401 as described above in detail in reference to FIGS. 4A and 4B.

At block 630, method 600 further includes logarithmically sampling the voltage to produce a digital value associated with the amount of force. For example, the sampling circuit 440 or 470 may logarithmically sample the voltage to produce a digital value associated with the amount of force detected by the pressure sensor 122 of FIG. 1 or the strain gauge sensor 410 of FIGS. 4A and 4B.

In one implementation, the sampling circuit 450 may include the linear amplifier 450 and the logarithmic ADC 462. The linear amplifier 450 may be a differential amplifier that amplifies the difference between two input voltages (e.g., 404'-402'). The difference between the two input voltages may be referred to as the first voltage and the amplified output, Vo, of the linear amplifier may be referred to as a second voltage. The second voltage is greater than the first voltage as the first voltage is amplified by the linear amplifier 450. The output Vo of the linear amplifier 450 is then sampled by a logarithmic ADC, as described above in reference to FIG. 4A, to produce a digital value, e.g., a ADC value.

In another implementation, the sampling circuit 470 may include the logarithmic amplifier 480 and the linear ADC 492. The logarithmic amplifier 480 may be a differential amplifier that amplifies the difference between two input voltages (e.g., 404'-402'). The difference between the two input voltages may be referred to as the first voltage and the amplified output, Vo, of the logarithmic amplifier 480 may be referred to as a second voltage. The second voltage is greater than the first voltage as the first voltage is amplified by the logarithmic amplifier 480. The output Vo of the logarithmic amplifier 480 is then sampled by a linear ADC 492, as described above in reference to FIG. 4B, to produce a digital value, e.g., a ADC value. The logarithmic amplifier 480 takes the voltages 404' and 402' as inputs and any small changes in the difference between the voltages may be significantly amplified due to the logarithmic nature of the differential amplifier 480, and may lead to different ADC values, as described above in detail in reference to FIG. 4B.

At block 640, method 600 further includes determining whether the device is operating in an inking state based on the digital value or sending the digital value to the digitizer. For example, the processor 112 of the pen 100 may determine whether the pen 100 is operating in an inking state based on the digital value produced by the sampling circuit 440 or 470. In one implementation, the processor 112 of the pen 100 may compare the digital value with a threshold value, and determine that the pen 100 is in an inking state when the digital value is equal to or greater than the threshold value. In another implementation, the pen 100 may send (or report, transmit, etc.) the digital value (or the amount of force) to the digitizer 200. The digitizer 200 may determine whether the pen 100 is in an inking state based on the amount of the force reported by the pen 100 and/or configuration at the digitizer 200.

The method 600 described above, in some example implementations, provides for higher accuracy (e.g., 0.2 gram accuracy) at low-forces range and uses an 8-bit ADC (e.g., 256 ADC values) resulting in a lower cost system and/or power savings.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device, which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a computer device (such as, but not limited to, a game console). In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with implementations disclosed herein.

What is claimed is:

1. A method of increasing low-force accuracy at a device for communicating with a digitizer, comprising:
    detecting, by a pressure sensor in the device, an amount of force at the tip of the device;
    generating, by the pressure sensor, a first voltage and a second voltage associated with the amount of force;
    calculating a differential voltage between the first voltage and the second voltage;
    amplifying the differential voltage to obtain an amplified voltage;
    logarithmically sampling the amplified voltage to produce a digital value associated with the amount of force; and
    determining whether the device is operating in an inking state based on the digital value or sending the digital value to the digitizer.

2. The method of claim 1, wherein the amplifying of the differential voltage comprises:
    amplifying, by a linear amplifier, the differential voltage to produce the amplified voltage, wherein the amplified voltage is greater than the differential voltage; and
    wherein logarithmically sampling the amplified voltage comprises:
    sampling, by a logarithmic analog-to-digital converter (ADC), the differential voltage to produce the digital value.

3. The method of claim 2, determining whether the device is operating in the inking state further comprises:
    comparing the digital value with a threshold value; and
    determining that the device is operating in the inking state when the digital value is equal to or greater than the threshold value.

4. The method of claim 1, wherein the amplifying of the differential voltage comprises:
    amplifying, by a logarithmic amplifier, the differential voltage to produce the amplified voltage, wherein the amplified voltage is greater than the differential voltage; and
    wherein logarithmically sampling the amplified voltage comprises:
    sampling, by a linear analog-to-digital converter (ADC), the differential voltage to produce the digital value.

5. The method of claim 4, determining whether the device is operating in the inking state further comprises:
    comparing the digital value with a threshold value; and
    determining that the device is operating in the inking state when the digital value is equal to or greater than the threshold value.

6. The method of claim 1, wherein the pressure sensor is a strain gauge sensor.

7. The method of claim 1, wherein the device is a pen or a stylus and the pressure sensor is positioned at or near the tip of the pen or the stylus.

8. The method of claim 1, wherein the pressure sensor is a microelectromechanical system (MEMS) sensor.

9. The method of claim 1, wherein the pressure sensor is a capacitive force sensor.

10. A device for increasing low-force accuracy at a device for communicating with a digitizer, comprising:
    a pressure sensor configured to detect an amount of force at the tip of the device and generate a first voltage and a second voltage associated with the amount of force;
    a sampling circuit configured to:
        calculate a differential voltage between the first voltage and the second voltage;
        amplify the differential voltage to obtain an amplified voltage; and
        logarithmically sample the amplified voltage to produce a digital value associated with the amount of force;
    a memory; and
    a processor in communication with the memory, wherein the processor is configured to:
        determine whether the device is operating in an inking state based on the digital value or send the digital value to the digitizer.

11. The device of claim 10, wherein the sampling circuit includes:
    a linear amplifier configured to amplify the differential voltage to produce the amplified voltage, wherein the amplified voltage is greater than the differential voltage; and
    a logarithmic analog-to-digital converter (ADC) configured to logarithmically sample the differential voltage to produce the digital value.

12. The device of claim 11, wherein the processor is further configured to:
    compare the digital value with a threshold value; and
    determine that the device is operating in the inking state when the digital value is equal to or above the threshold value.

13. The device of claim 10, wherein the sampling circuit includes:
    a logarithmic amplifier configured to amplify the differential voltage to produce the amplified voltage, wherein the amplified voltage is greater than the differential voltage; and
    a linear analog-to-digital converter (ADC) configured to sample the differential voltage to produce the digital value.

14. The device of claim 13, wherein the processor is further configured to:
   compare the digital value with a threshold value; and
   determine that the device is operating in the inking state when the digital value is equal to or above the threshold value.

15. The device of claim 10, wherein the pressure sensor is a strain gauge sensor.

16. The device of claim 10, wherein the device is a pen or a stylus and the pressure sensor is located at or near the tip of the pen or the stylus.

17. The device of claim 10, wherein the pressure sensor is a microelectromechanical system (MEMS) sensor.

18. The device of claim 10, wherein the pressure sensor is a capacitive force sensor.

\* \* \* \* \*